United States Patent
Zhu

(10) Patent No.: US 11,231,501 B2
(45) Date of Patent: Jan. 25, 2022

(54) FRONT AND SIDE THREE-LIDAR DESIGN FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/584,727

(22) Filed: Sep. 26, 2019

(65) Prior Publication Data

US 2021/0096248 A1    Apr. 1, 2021

(51) Int. Cl.

| G08G 1/01 | (2006.01) |
|---|---|
| G01S 17/86 | (2020.01) |
| G01S 17/88 | (2006.01) |
| G08G 1/048 | (2006.01) |
| G01S 17/04 | (2020.01) |

(52) U.S. Cl.
CPC ............. G01S 17/86 (2020.01); G01S 17/04 (2020.01); G01S 17/88 (2013.01); G08G 1/048 (2013.01)

(58) Field of Classification Search
CPC .......... G01S 17/86; G01S 17/88; G01S 17/04; G08G 1/048
See application file for complete search history.

(56) References Cited

U.S. PATENT DOCUMENTS

| 10,255,670 | B1 | 4/2019 | Wu | |
| 10,520,319 | B2* | 12/2019 | Zhu | ........................ G07C 5/00 |
| 2006/0061656 | A1 | 3/2006 | Lang et al. | |
| 2015/0192677 | A1 | 7/2015 | Yu | |
| 2016/0217331 | A1 | 7/2016 | Kowatari | |
| 2017/0090476 | A1 | 3/2017 | Letwin | |
| 2017/0341491 | A1 | 11/2017 | Nakagawa | |
| 2017/0357267 | A1 | 12/2017 | Foster | |
| 2018/0011173 | A1 | 1/2018 | Newman | |
| 2018/0108134 | A1 | 4/2018 | Venable | |
| 2018/0190046 | A1* | 7/2018 | Levinson | ............. G07C 5/0808 |
| 2018/0257661 | A1* | 9/2018 | Kroop | .................... G08G 1/164 |
| 2019/0176696 | A1 | 6/2019 | Iwasaki | |
| 2019/0265703 | A1 | 8/2019 | Hicok | |
| 2019/0277962 | A1* | 9/2019 | Ingram | .................. G01S 13/86 |
| 2019/0304310 | A1* | 10/2019 | Tao | ....................... G05D 1/0246 |
| 2019/0384314 | A1 | 12/2019 | Jacobsen | |
| 2020/0099872 | A1* | 3/2020 | Benemann | ................ G01S 7/51 |
| 2020/0142067 | A1 | 5/2020 | Wang | |
| 2020/0183008 | A1* | 6/2020 | Chen | .................... G05D 1/0238 |

* cited by examiner

*Primary Examiner* — Julie B Lieu
(74) *Attorney, Agent, or Firm* — Womble Bond Dickinson (US) LLP

(57) ABSTRACT

An ADV includes a vehicle frame housing the ADV, a first LIDAR, a second LIDAR, a third LIDAR devices, and an autonomous driving system responsible for autonomously driving the ADV. The first LIDAR device is mounted on a frontend of the vehicle frame. The second LIDAR device is mounted on a first side (e.g., left side) of the vehicle frame and the third LIDAR device is mounted on a second side (e.g., right side) of the vehicle frame. The autonomous driving system includes a perception module and a planning module. The perception module is configured to perceive a driving environment surrounding the ADV at least based on LIDAR data obtained from the first, second, and third LIDAR devices. The planning module is configured to plan a path to drive the ADV based on perception data from the perception module representing the driving environment. The ADV may be an autonomous driving bus.

10 Claims, 8 Drawing Sheets

FRONT AND SIDE THREE-LIDAR DESIGN FOR AUTONOMOUS DRIVING VEHICLES

TECHNICAL FIELD

Embodiments of the present disclosure relate generally to operating autonomous driving vehicles. More particularly, embodiments of the disclosure relate to LIDAR designs for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, such as a light detection and range (LIDAR) device, allowing the vehicle to travel with minimal human interaction or in some cases without any passengers.

For some of the autonomous driving vehicles with larger dimension such as a bus, LIDAR sensor integration is harder than normal passenger vehicles, because a larger size vehicle has a bigger blind spot, which may not be sufficient to capture the driving environment of the vehicle. There has been a lack of efficient LIDAR configuration that can cover larger vehicles.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
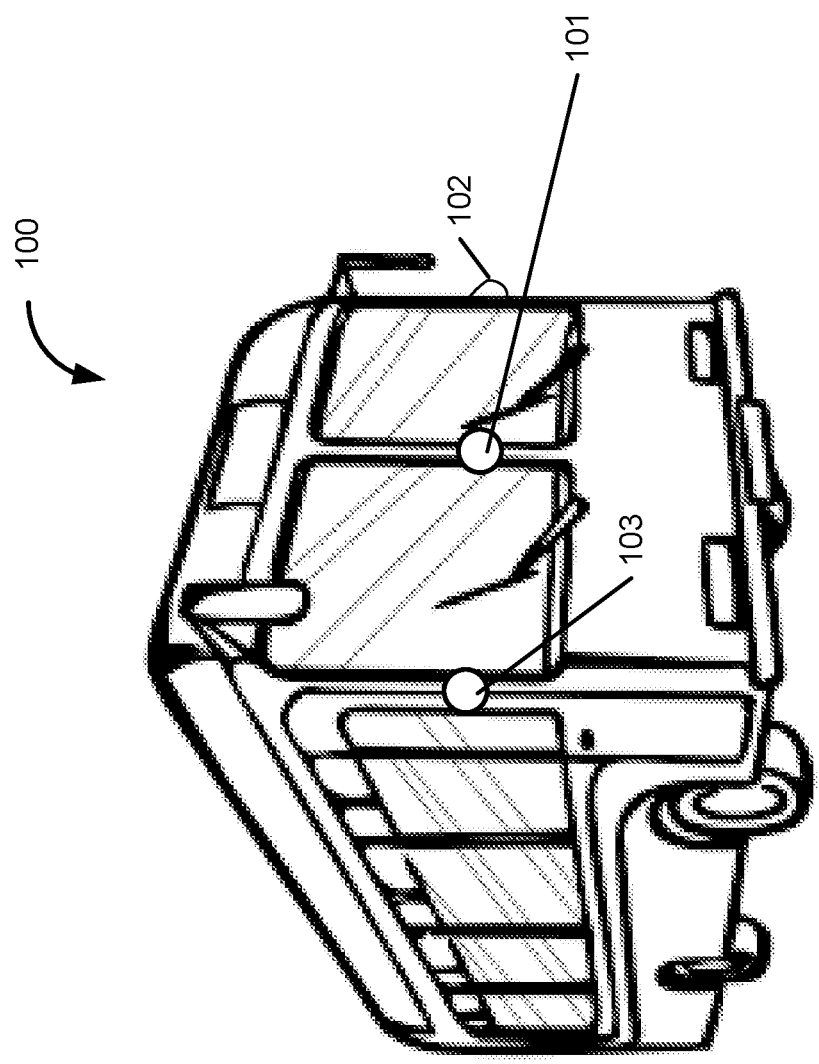
FIG. 1 shows a perspective view of an autonomous driving vehicle according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an autonomous driving vehicle (ADV) includes a vehicle frame housing the ADV, a first LIDAR device mounted on a frontend of the vehicle frame, a second LIDAR device mounted on a left or first side of the vehicle frame, a third LIDAR device mounted on a right or second side of the vehicle frame. The ADV further includes an autonomous driving system having a perception module coupled to the first, second, and third LIDAR devices to perceive a driving environment surrounding the ADV based on LIDAR data received from the first, second, and third LIDAR devices. The autonomous driving system further includes a planning module to plan a path to drive the ADV based on perception data representing the driving environment received from the perception module. The ADV may be a bus.

In one embodiment, an ADV includes a vehicle frame housing the ADV, a first LIDAR, a second LIDAR, a third LIDAR devices, and an autonomous driving system responsible for autonomously driving the ADV. The first LIDAR device is mounted on a frontend of the vehicle frame. The second LIDAR device is mounted on a first side (e.g., left side) of the vehicle frame and the third LIDAR device is mounted on a second side (e.g., right side) of the vehicle frame. The autonomous driving system includes a perception module and a planning module. The perception module is configured to perceive a driving environment surrounding the ADV at least based on LIDAR data obtained from the first, second, and third LIDAR devices. The planning module is configured to plan a path to drive the ADV based on perception data from the perception module representing the driving environment. The ADV may be an autonomous driving bus.

In one embodiment, the first LIDAR device is mounted on a location of the frontend that is approximately 80 to 120 centimeters (cm) above the ground. The first LIDAR device may be configured to operate with a first horizontal field of view (FOV) of approximately 180 degrees towards forwardly. The first center light beam of the first LIDAR device is tilted downwardly by approximately 5 degrees. The first LIDAR device is configured to operate with a vertical FOV of [−30, 10] degrees. Similarly, the second and third LIDAR devices are mounted on a location that is approximately 80 to 120 cm above the ground.

In one embodiment, the second LIDAR device is mounted near a corner of the frontend and the left side of the vehicle frame and the third LIDAR device is mounted near a corner of the frontend and the right side of the vehicle frame. The second LIDAR device is configured to operate with an FOV of around 200 to 220 degrees. Similarly, the third LIDAR device is configured to operate an FOV of around 200 to 220 degrees. At least a portion of the FOV of the second and third LIDAR devices are overlapped in coverage. The distance between the closest overlap point between the FOVs of the second and third LIDAR devices and the frontend of the ADV is shorter than 5 meters (m). The closest distance between a coverage point of the second LIDAR device and the backend of the vehicle frame is shorter than 30 cm. Similarly, the closest distance between the coverage point of the FOV of the third LIDAR device and the backend of the vehicle frame is shorter than 30 cm.

FIG. 1 is a block diagram illustrating an example of an autonomous vehicle according to one embodiment. Referring to FIG. 1, in this example, vehicle 100 is a bus for illustration purpose only; other vehicles may also be applicable. In one embodiment, ADV 100 includes a first LIDAR device 101 mounted on the frontend of the vehicle frame of ADV 100, a second LIDAR device 102 mounted on the left side of the vehicle frame of ADV 100. The second LIDAR device 102 is mounted near the corner (e.g., pillar) between the frontend and the left side of the vehicle frame and the third LIDAR device 103 is mounted near the corner between the frontend and the right side of the vehicle frame.

Figure 2:
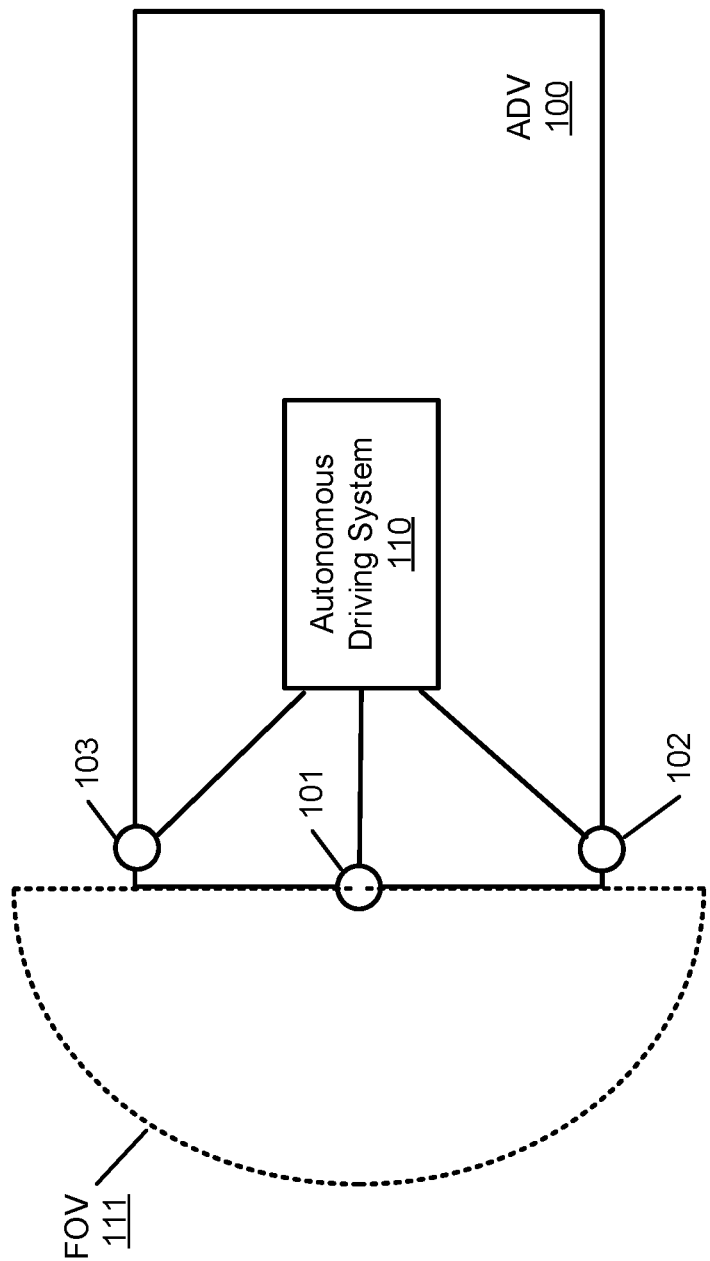
FIG. 2 shows a top view of an autonomous driving vehicle according to one embodiment.

FIG. 2 shows a top view of an autonomous driving vehicle according to one embodiment. Referring to FIG. 2, in one embodiment, the horizontal FOV of LIDAR device 101 is approximately 180 degrees. ADV 100 further includes one or more computer systems therein operating as an autonomous driving system 110, including a perception module (not shown) to perceive a driving environment surrounding ADV 100 based at least in part of the LIDAR data obtained from LIDAR devices 101-103. Autonomous driving system 110 further includes a planning module (not shown) to plan a path based on the perception data produced by the perception module to autonomous drive ADV 100 navigating through the driving environment. Further details of autonomous driving system 110 will be described further below.

Figure 3:
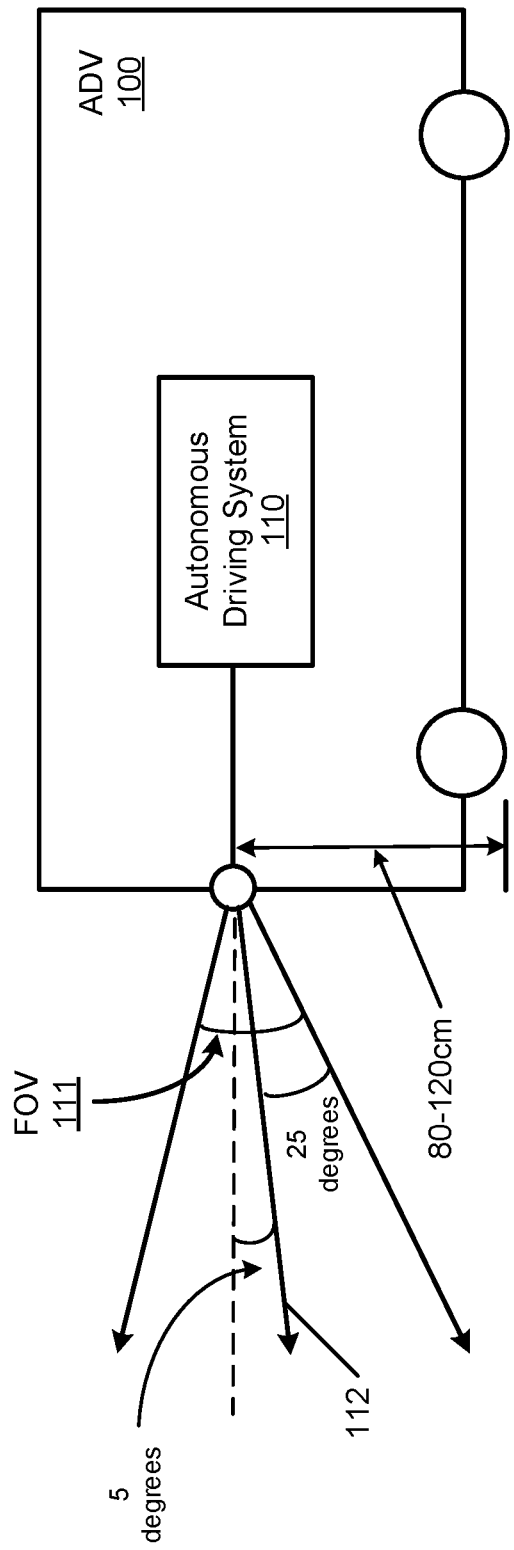
FIG. 3 shows a side view of an autonomous driving vehicle according to one embodiment.

FIG. 3 shows a side of an autonomous driving vehicle according to one embodiment. Referring to FIG. 3, LIDAR device 101 is mounted around 80-120 cm above ground. Similarly, although not shown, LIDAR devices 102-103 may also be mounted on a location around 80-120 cm above the ground. In addition, the beaming direction of LIDAR device 101 is tilted downwardly by approximately 5 degrees with respect to the horizontal level. Specifically, the center light beam 112 is tilted downwardly by 5 degrees. In one embodiment, LIDAR device 101 is configured to operate with a vertical FOV of [−30, 10] degrees with respect to the horizontal level. In one embodiment, LIDAR devices 102-103 are mounted with a flat vertical FOV, approximately [−20, 20] degrees with respect to the horizontal level.

Figure 4:
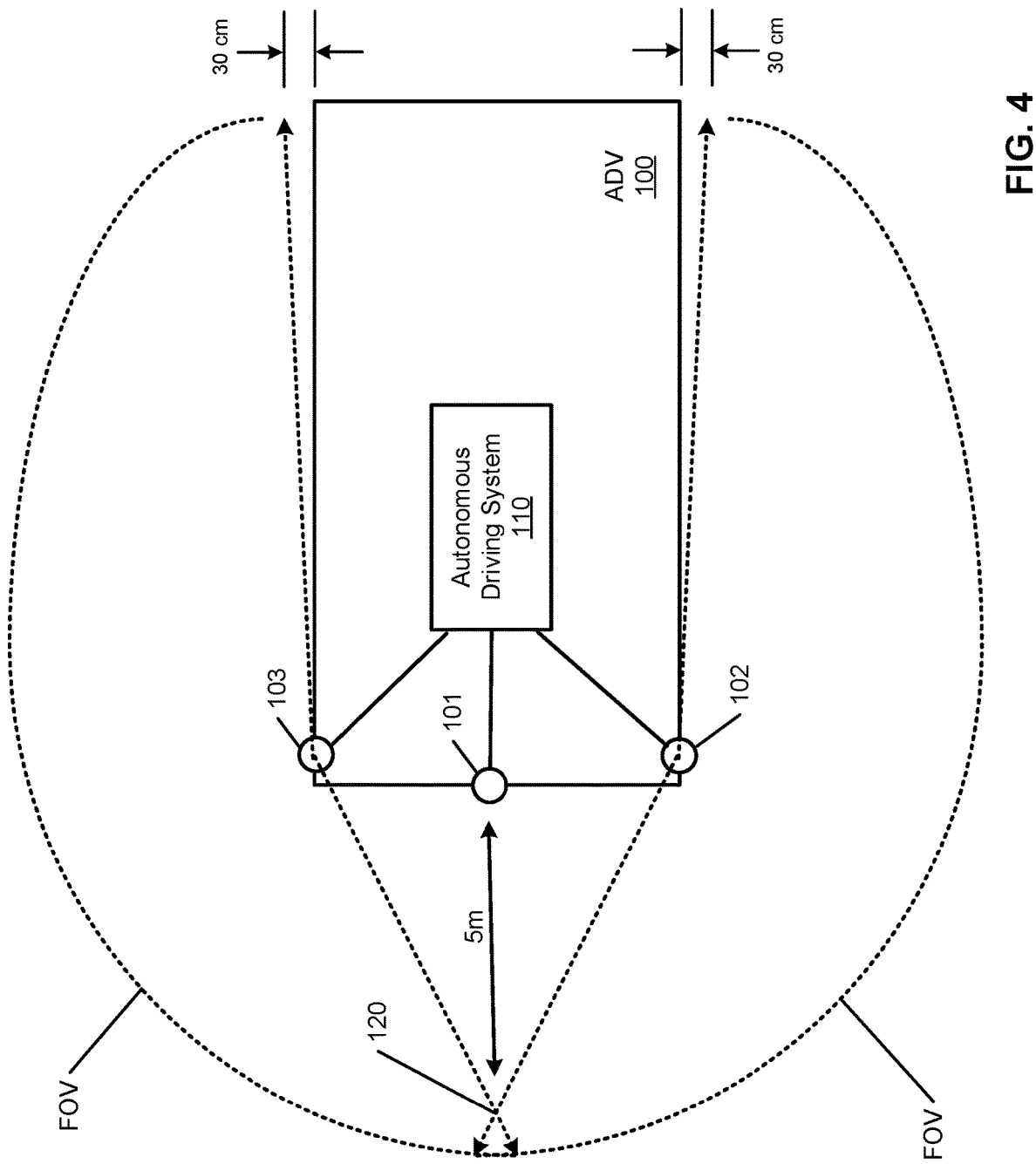
FIG. 4 shows a top view of an autonomous driving vehicle according to another embodiment.

FIG. 4 shows a top view of an autonomous driving vehicle according to another embodiment. Referring to FIG. 4, LIDAR device 102 is configured to operate with a horizontal FOV of approximately 200 to 220 degrees. Similarly, LIDAR device 103 is configured to operate with a horizontal FOV of approximately 200 to 220 degrees. In one embodiment, LIDAR devices 102-103 are positioned with a horizontal angle such that at least a portion of the FOV of LIDAR device 102 and the FOV of LIDAR device 103 overlaps in front of the vehicle frame as shown in FIG. 4. The distance between closest overlap point of two horizontal FOVs 120 and LIDAR device 101 is shorter than 5 meters.

Figure 5:
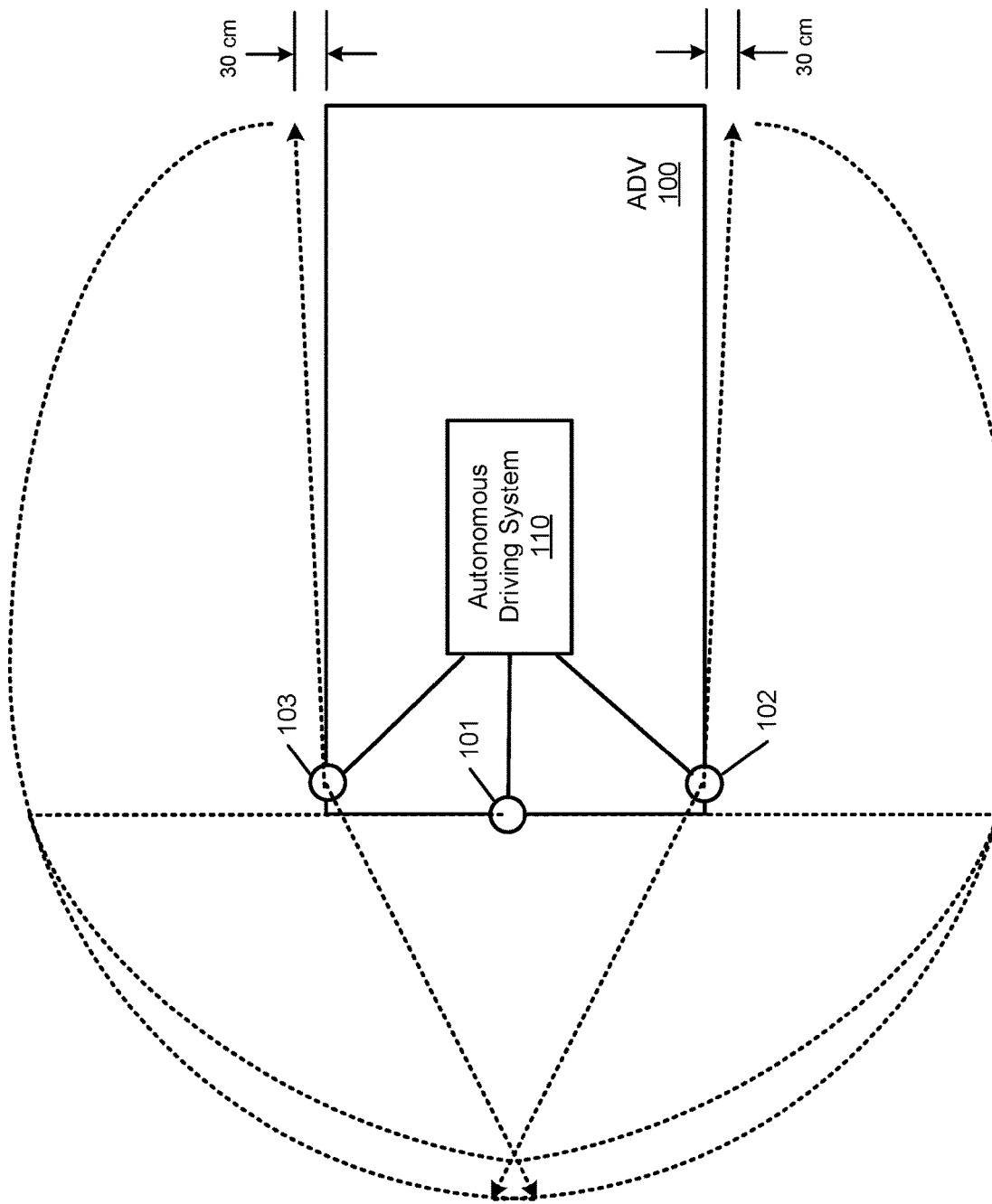
FIG. 5 shows a top view of an autonomous driving vehicle according to another embodiment.

In one embodiment, LIDAR device 102 is positioned with a horizontal angle such that the closest or shortest distance between a coverage point of the corresponding horizontal FOV and the backend of the vehicle frame is shorter than 30 cm, in order to minimize the blind spot of the vehicle. Similarly, LIDAR device 103 is positioned with a horizontal angle such that the closest or shortest distance between a coverage point of the corresponding horizontal FOV and the backend of the vehicle frame is shorter than 30 cm. FIG. 5 shows a coverage of all three horizontal FOVs of LIDAR devices 101-103. The LIDAR configuration as described above can be utilized by autonomous driving system 110 for autonomously drive the vehicle.

Figure 6:
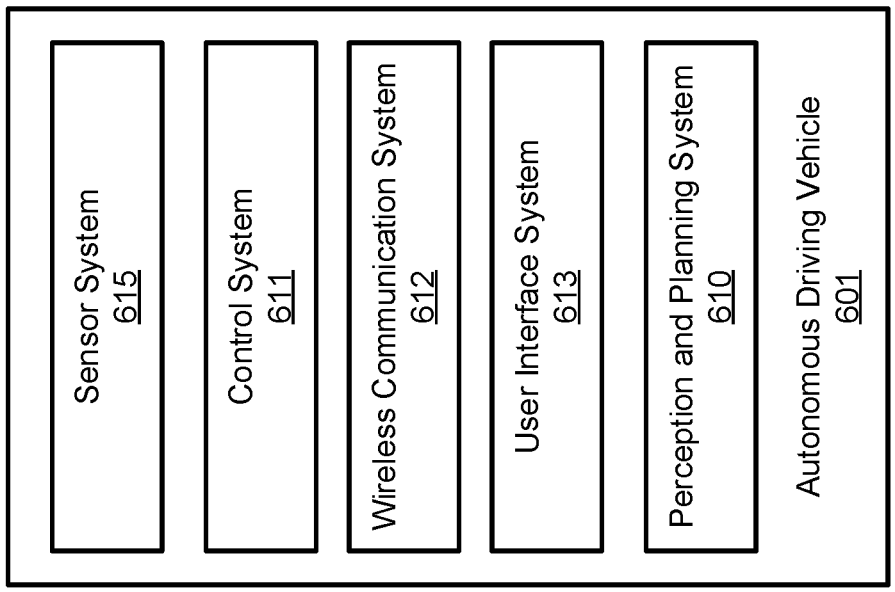
FIG. 6 is a block diagram illustrating an autonomous driving vehicle according to one embodiment.

FIG. 6 is a block diagram illustrating an autonomous driving vehicle according to one embodiment of the disclosure. Vehicle 600 can represent vehicle 100 as described above. Referring to FIG. 6, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, perception and planning system 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
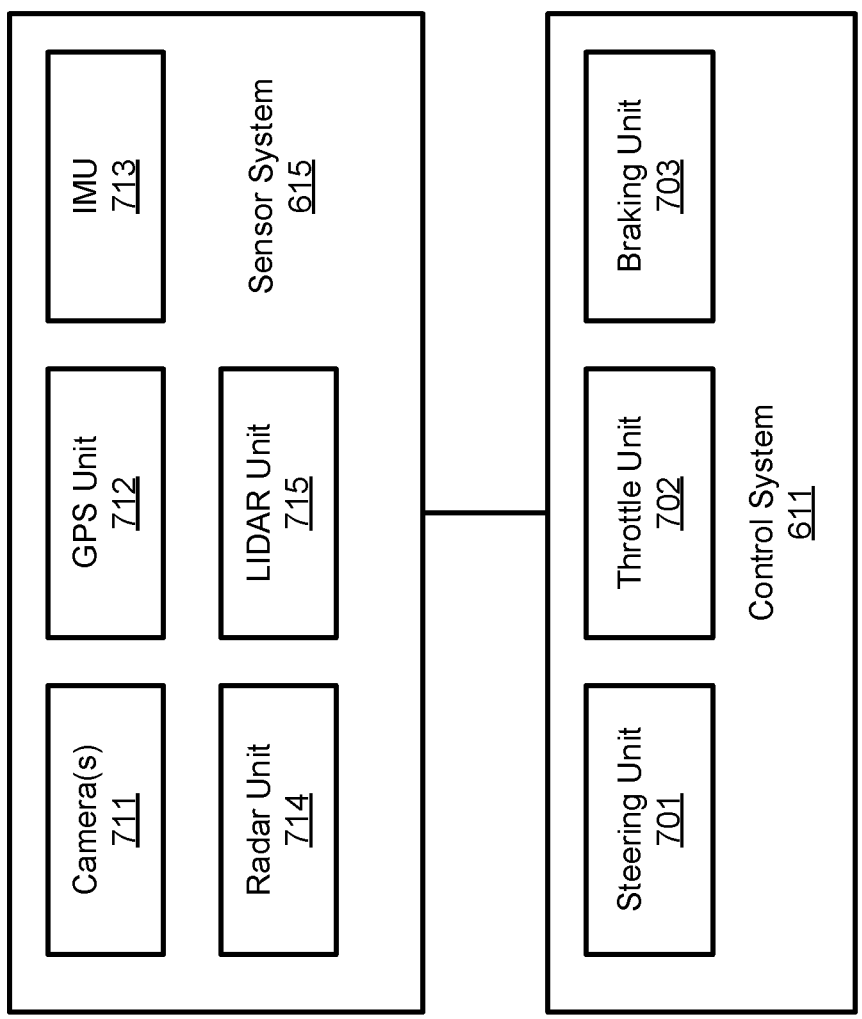
FIG. 7 is a block diagram illustrating an example of an autonomous driving vehicle according to one embodiment.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. LIDAR unit 715 may include at least some of the LIDAR devices mounted with specific configurations as described above. Cameras 711 may include one or more devices to capture images of the environment surrounding the autonomous driving vehicle.

Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601 is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 8:
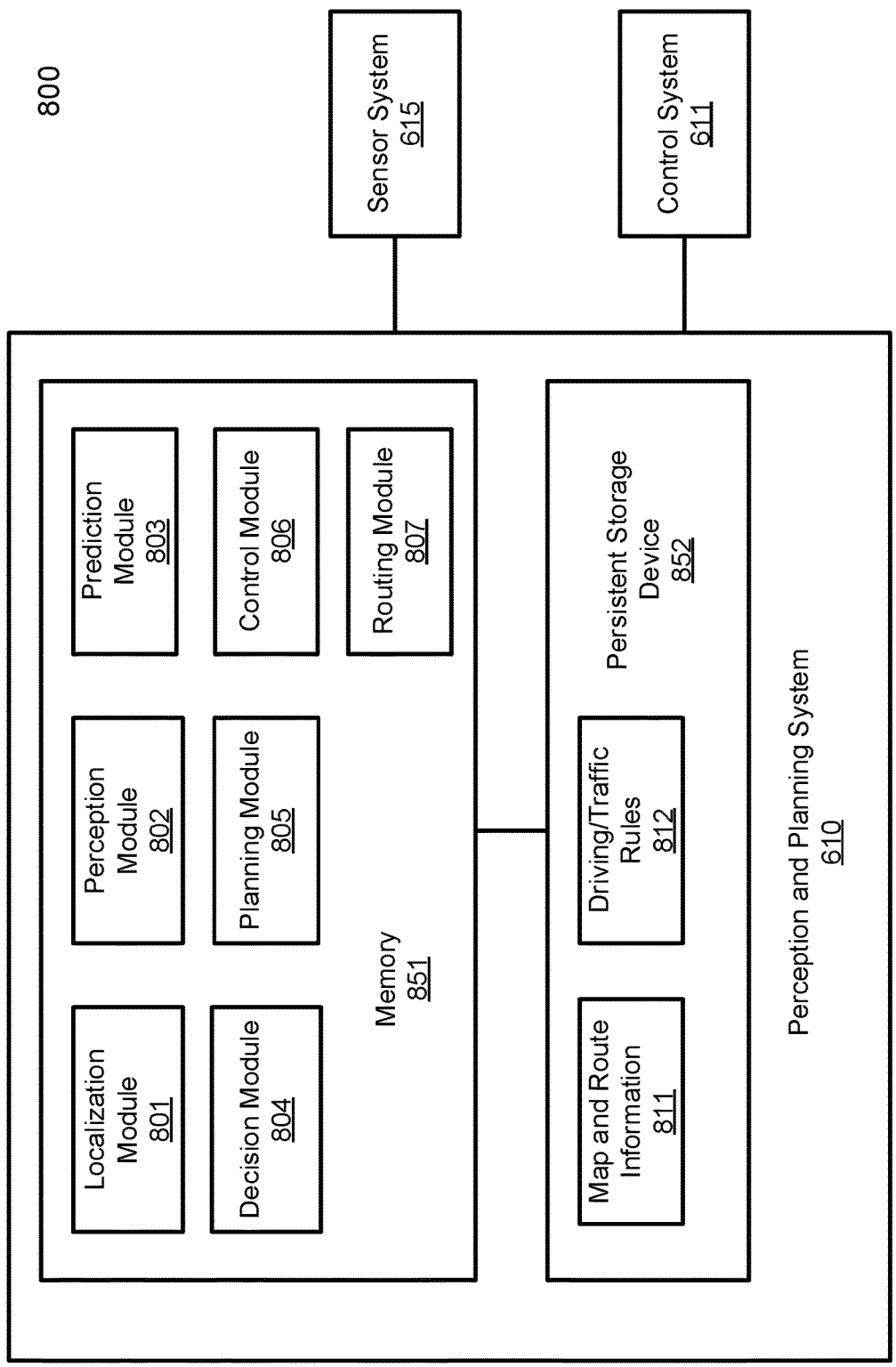
FIG. 8 is a block diagram illustrating an example of a perception and planning system used with an autonomous driving vehicle according to one embodiment.

FIG. 8 is a block diagram illustrating an example of a perception and planning system used with an autonomous driving vehicle according to one embodiment. System 800 may be implemented as a part of autonomous driving vehicle 601 of FIG. 6 including, but is not limited to, perception and planning system 610, control system 611, and sensor system 615. Referring to FIG. 8, perception and planning system 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. An autonomous driving vehicle, comprising:
    a vehicle frame housing the autonomous driving vehicle (ADV), wherein the autonomous driving vehicle is a bus;
    a first light detection and range (LIDAR) device mounted on a frontend of the vehicle frame;
    a second LIDAR device mounted on a left side of the vehicle frame;
    a third LIDAR device mounted on a right side of the vehicle frame, wherein the second LIDAR device is mounted near a corner of the frontend and the left side of the vehicle frame and the third LIDAR device is mounted near a corner of the frontend and the right side of the vehicle frame, wherein the first LIDAR device is configured to operate with a first horizontal field of view (FOV) of approximately 180 degrees towards forwardly, wherein the first LIDAR device is configured to operate with a vertical FOV of [−30, 10] degrees, wherein the second LIDAR device is configured to operate with a second horizontal FOV of approximately 200 to 220 degrees, and wherein the third LIDAR device is configured to operate with a third horizontal FOV of approximately 200 to 220 degrees; and
    an autonomous driving system coupled to the first, second, and third LIDAR devices, wherein the autonomous driving system comprises a perception module coupled to the first, second, and third LIDAR devices to perceive a driving environment surrounding the ADV based on LIDAR data received from the first, second, and third LIDAR devices, and wherein the autonomous driving system further comprises a planning module to plan a path to drive the ADV based on perception data representing the driving environment received from the perception module.

2. The autonomous driving vehicle of claim 1, wherein the autonomous driving vehicle is a bus.

3. The autonomous driving vehicle of claim 1, wherein the first LIDAR device is mounted on a location of the frontend that is approximately 80 to 120 centimeters (cm) above ground.

4. The autonomous driving vehicle of claim 1, wherein a center light beam of the first LIDAR device is tilted downwardly by approximately 5 degrees.

5. The autonomous driving vehicle of claim 1, wherein the second LIDAR device is mounted on a location that is approximately 80 to 120 centimeters (cm) above ground.

6. The autonomous driving vehicle of claim 1, wherein the third LIDAR device is mounted on a location that is approximately 80 to 120 centimeters (cm) above ground.

7. The autonomous driving vehicle of claim 1 wherein at least a portion of a second horizontal FOV produced by the second LIDAR device overlaps at least a portion of a third horizontal FOV produced by the third LIDAR device.

8. The autonomous driving vehicle of claim 7, wherein a distance between a closest overlap point between the second and third horizontal FOVs and the frontend of the ADV is shorter than 5 meters.

9. The autonomous driving vehicle of claim 7, wherein a closest distance between a coverage point of the second FOV and a backend of the vehicle frame is shorter than 30 cm.

10. The autonomous driving vehicle of claim 7, wherein a closest distance between a coverage point of the third FOV and a backend of the vehicle frame is shorter than 30 cm.

\* \* \* \* \*